United States Patent [19]
Sumner et al.

[11] 3,807,442
[45] Apr. 30, 1974

[54] EXCESS FLOW CHECK VALVE WITH VARIABLE CLOSING FLOW RATE

[75] Inventors: William D. Sumner, McKinney; Gary L. Koch, Allen, both of Tex.

[73] Assignee: Fisher Controls Company, Inc., Marshalltown, Iowa

[22] Filed: Mar. 8, 1972

[21] Appl. No.: 232,811

[52] U.S. Cl................ 137/498, 137/517, 137/493.9
[51] Int. Cl............................................. F16k 17/24
[58] Field of Search ........ 137/517, 519, 519.5, 522, 137/523, 524, 493.9, 530, 541, 543.21, 539.5, 454.5, 460, 498, 480; 251/82, 83

[56] References Cited
UNITED STATES PATENTS

| | | | |
|---|---|---|---|
| 2,138,719 | 11/1938 | Wright | 137/498 |
| 2,668,555 | 2/1954 | Bartolat | 137/498 |
| 2,699,799 | 1/1955 | Wager | 137/498 |
| 3,677,237 | 7/1972 | Hansen | 137/480 |
| 3,368,581 | 2/1968 | Glover, Jr. | 137/460 |
| 2,396,037 | 3/1946 | Bliss | 137/519 |
| 3,326,233 | 6/1967 | Perruzzi | 137/519 X |
| 3,095,899 | 7/1963 | Billington | 137/454.5 |
| 3,675,487 | 7/1972 | Mueller | 137/517 X |
| 2,389,887 | 11/1945 | Baxter et al. | 137/517 |
| 3,559,678 | 2/1971 | Donner | 137/539.5 X |
| 3,631,893 | 1/1972 | Seaman | 137/517 X |

*Primary Examiner*—William R. Cline
*Attorney, Agent, or Firm*—Harold R. Patton; Neal E. Willis

[57] ABSTRACT

Described herein are excess-flow valves of the type employing a poppet or check valve member which is actuated to close an orifice when the flow rate therethrough exceeds a predetermined rate. A coiled spring is used to urge and retain the poppet or check valve member in spaced relationship from the orifice under flow rates less than the excess-flow rate. Various retainer means are described for setting and adjusting the travel of the poppet or check valve member such that, by precisely controlling the travel, it is possible to obtain different closing flow rates without changing the excess-flow spring, modifying the orifice size, or the like, and in addition, insure the repeatability of the valve closing at the desired flow rate.

6 Claims, 7 Drawing Figures

EXCESS FLOW CHECK VALVE WITH VARIABLE CLOSING FLOW RATE

FIELD OF THE INVENTION

The present invention relates generally to excess-flow check valves for use in equipment such as that employed with liquified petroleum gas, and more particularly to excess-flow check valves which may be employed in applications where minimal deviations of the closing flow rate can be tolerated, especially at very low flow rates, and methods whereby the closing flow rate may be readily and accurately varied.

BACKGROUND OF THE INVENTION

Excess-flow check valves are commonly employed where it is desirable to limit the flow rate of a liquid or a vapor, in one flow direction, to a predetermined maximum rate. If the flow rate exceeds the predetermined rate, indicating a malfunction or dangerous condition situation, such as a hose, pipe or fitting failure, the valve will check shut automatically, thereby preventing excessive discharge of the liquid or vapor.

DESCRIPTION OF THE PRIOR ART

Heretofore, one common practice was to employ an excess-flow check valve having a spherically-shaped poppet or "ball" secured to an excess-flow spring for movement toward and away from an orifice formed in the valve body. In such prior art check valves, and under normal flow conditions, the poppet is free to position itself at distances spaced from the orifice, which distances tend to vary depending on the spring-rate of the excess-flow spring, the flow rate, etc.; that is, the poppet-orifice spacing or, as it is commonly referred to, the travel of the poppet is not fixed with any degree of certainty or accuracy. Heretofore, the determinative factor influencing the closing rate of such valves was the spring rate of the excess-flow spring. Consequently, to change the closing rate required the replacement of the excess-flow spring. Thus, in order to change the closing flow rating of the valve, it was necessary to disassemble the associated piping or fittings, as well as the valve itself, thereby to gain access to and replace the excess-flow spring.

Another type of known excess-flow valve which includes apparatus for adjusting the check valve member is shown in U.S. Pat. No. 3,095,899 in Billington. However, the adjustment of this type of valve is for the purpose of selectively effecting a tight seal when the valve is not in use or positioning the valve member to its one and only flow-monitoring position.

Although such excess-flow check valves have served the general purpose, they have not proved entirely satisfactory under all conditions of service for the reason that they cannot be readily adjusted to accurately change the excess-flow closing rate, such that the valve can be employed for applications requiring different closing rates, without replacing any of its component parts. In addition, because the poppet travel is not controlled in a precise manner, long term repeatability of excess-flow closure at the desired closing rate is not always possible. This is especially true in instances where the excess-flow valve is being used to monitor extremely low flow conditions; for example, on the order of 200–250 cubic feet per hour. For such applications, we have discovered that it is most difficult, if not practically impossible, to meet many state requirements that the valve must close within 10 percent of its rated closing flow specifications, unless the poppet travel is very precisely controlled.

SUMMARY OF THE INVENTION

The general purpose of this invention is to provide excess-flow check valves and a method of establishing the closing flow rate thereof, which embrace all of the advantages of similarly employed check valves, yet do not possess the aforedescribed disadvantages. To attain this, the present invention utilizes the unique combination of check valve member together with an adjustable retainer member in engagement therewith to insure that the travel of the check valve member may be readily adjusted to correspond accurately to a desired closing flow rate.

An object of the present invention is the provision of a novel excess-flow check valve comprised of conventional components and which may be readily and accurately set to adjustably vary the closing flow rate.

Anther object is the provision of an excess-flow valve having an improved repeatability characteristic of its closing flow rate at low fluid flow rates.

A further object of the present invention is the provision of an excess-flow valve wherein turbulence of the fluid flow in the vicinity of the orifice is minimized to prevent fluxuations in the pressure differential thereacross.

A still further object of the present invention is the provision of a method for accurately adjusting the desired closing flow rate of an excess-flow valve and insuring repeatability thereof.

Yet another object of the present invention is the provision of an excess-flow valve including component parts for readily adjusting the desired closing flow rate and indicating to an operator the value of such rate.

In the present invention, these purposes (as well as others apparent herein) are achieved generally by providing an excess-flow check valve including a body member having an orifice disposed along a fluid flow passage which connects two spaced-apart ports. A valve member or poppet, of the size sufficient to close th orifice when registered therewith, is slidably disposed within the fluid flow passage for movement toward and away from the orifice. Acting on the valve member to urge it away from the orifice, is a force applied by means of an excess-flow spring. Acting to urge the valve member toward closing is the pressure differential established across the orifice as a result of the fluid flow. Retainer means are provided to engage the valve member and position it at a predetermined, selected distance from the orifice. The retainer means is adapted to be positioned at various positions with the valve body member such that the travel of the valve member may be adjusted or varied to obtain closing flow rates selected for particular applications of the check valve.

BRIEF DESCRIPTION OF THE DRAWINGS

Utilization of the invention will become apparent to those skilled in the art from the disclosures made in the following description of preferred embodiments of the invention, as illustrated in the accompanying drawings, in which.

DESCRIPTION OF PREFERRED EMBODIMENTS

Figure 1:
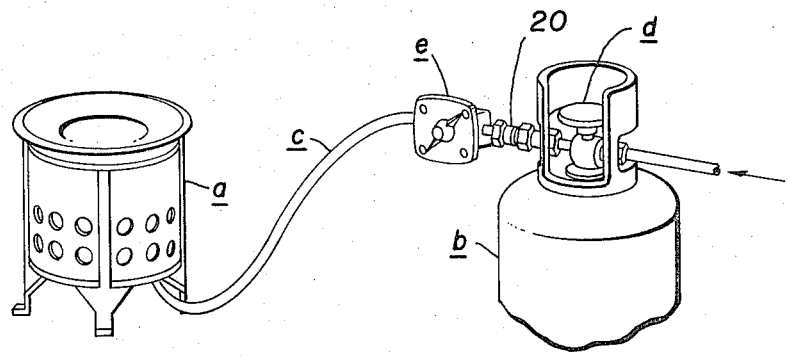
FIG. 1 is a perspective view of a space heater installation supplied by liquified petroleum gas, or the like, and revealing a typical application for an excess-flow valve constructed in accordance with the present invention.

Referring now to the drawings, there is shown in FIG. 1, a space heater installation, including a heater, generally designated a, an LP-gas (propane, butane, or mixtures thereof) container or cylinder b, and a connecting fuel line c. The cylinder b includes conventional valve fittings d and a pressure regulator e employed to insure that the supply pressure to the space heater a is maintained at a level corresponding to that for which it was designed. The structure and function of the afore-described apparatus of FIG. 1 are well known and form no part of the present invention. Therefore, they will not be described in detail.

Between, and communicating with, the pressure regulator e and the valve fitting d of the LP-gas container b, there is provided an excess-flow check valve, generally designated 20. The check valve may be formed as an integral part of the input of the regulator e or adapted to be connected thereto in any well-known manner, such as by means of a threaded connection. The purpose of the excess-flow check valve 20 is to insure that the fuel supply is interrupted should the pressure regulator e fail in its full open position, the fuel line c break, or some similar malfunction occur at the heater a, the result of which is a temporary surge or excess flow of fuel from the cylinder b.

Figure 2:
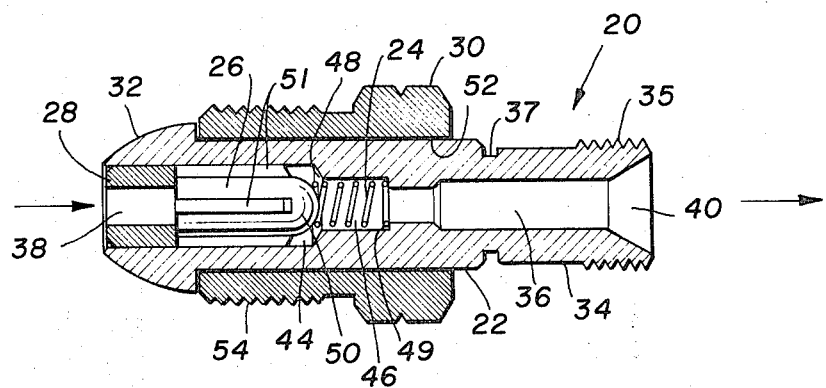
FIG. 2 is a cross-sectional view of one embodiment of an excess-flow check valve constructed in accordance with the present invention, the travel-determining retainer member being shown positioned to permit maximum travel of the check valve poppet.
Figure 3:
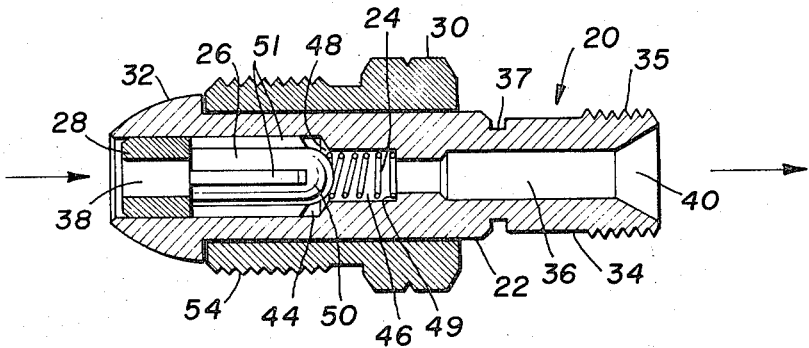
FIG. 3 is a cross-sectional view substantially identical to that of FIG. 2, showing the travel-determining retainer member positioned to effect closing at a lower flow rate than that resulting from the positioning shown in FIG. 2.
Figure 4:
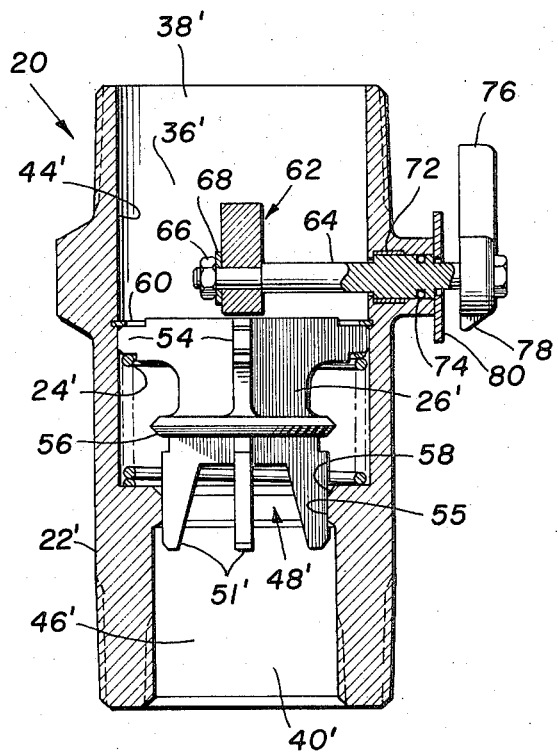
FIG. 4 is a cross-sectional view of another embodiment of the excess-flow check valve of the present invention, wherein the retainer member takes the form of an operator-actuated cam, the position of which is referenced to indicia provided externally.

Referring now to FIGS. 2 and 3, the excess-flow check valve assembly 20 and its constituent parts are shown in cross-sectional detail. The check valve 20 is comprised of a valve body part 22, an excess-flow spring 24, a check valve or poppet member 26, a poppet retainer member 28, and a coupling nut and sleeve 30.

Preferably, the valve body part 22 is machined from brass rod stock or some other suitable metal or metal-alloy stock. It includes a generally rounded nose portion 32 adapted to be fitted within and sealedly secured to the valve fitting d as shown in FIG. 1. The tail portion 34 of the valve body part 22 is provided with external threads 35 so that the valve 20 may be secured to the pressure regulator e, as indicated in FIG. 1, or directly to the line c if the regulator is omitted. In addition, the tail portion 34 includes a weakening-groove 37 to insure that the valve 20 will break downstream of its flow-sensing orifice should it, and its associated apparatus, be subjected to improper handling or treatment. Under such conditions, the check valve 20 will remain intact and operable so as to prevent the escape of fuel from the container b.

As may be seen in FIGS. 2 and 3, the valve body part 22 is appropriately drilled or otherwise provided with a fluid-flow passage 36 which provides fluid flow communication between the ports 38 and 40 disposed at each end thereof. The fluid flow passageway 36 is formed to include a large poppet-housing chamber 44, cylindrical in shape and shown adjacent to the port 38 in FIGS. 1 and 2. A smaller cylindrical chamber 46 is provided within the valve body member 22 adjacent to the chamber 44, and at the intersection therewith forms a fluid-flow sensing orifice 48. The excess-flow spring 24, preferably formed of coiled stainless steel, is fitted within the chamber 46 and is retained at its one end by a flange 49 formed within the valve body part 22, and at its other end engages the rounded nose portion 50 of the poppet member 26 disposed within the large chamber 44. The nose-portion 50 of the poppet member 26 is of sufficient size to effectively close the orifice 48 when it is positioned to register therewith and provide a metal-to-metal seal with the bevelled portion of the valve body part 22 provided at the orifice 48.

The poppet member 26 is provided with four equally-spaced guide fins 51 arranged to extend axially so as to slidably engage the wall which defines the large chamber 44. The guide fins 51 serve to guide the member 26 in its movement and also serve to partition and direct the fluid flow from the port 38 to the orifice 48 in a streamlined manner so that turbulence is minimized. Between the poppet member 26 and the port 38, the check valve 20 is provided with the travel-determining retainer part 28. Preferably the retainer part takes the form of a metal, annular ring which may be inserted in the chamber 44, as by swaging, to engage and position the poppet member 26. As may be seen by comparing the positins assumed by the poppet member 26 in the chamber 44 in FIGS. 2 and 3, the poppet member 26 may be fixed in predetermined positions with its nose portion 50 spaced from the orifice 48, thereby to fix the travel of the poppet member 26. Thus, the position assumed by the poppet member 26 is determined by the positioning of the retainer part 28, together with the urging force of the excess-flow spring 24 which, under normal fluid flow conditions, maintains the desired travel distance.

The coupling nut and sleeve 30 includes the bore 52 adapted to receive the central, shank portion of the valve body part 22.

The coupling nut and sleeve 30 includes external threads 54 useful in securing the excess-flow check valve 20 to a valve fitting d as shown in FIG. 1, for example.

OPERATION OF THE EXCESS-FLOW CHECK VALVE OF FIGS. 2 AND 3

As may be seen in FIGS. 2 and 3, fluid may flow in either direction through the excess-flow check valve 20. When the fluid flow is from left to right, as viewed in FIGS. 2 and 3, or, in other words, from port 38, through the passage 36, to the port 40, the excess-flow check valve is capable of monitoring the fluid flow rate therethrough and checking shut to cut off the flow, when it exceeds a predetermined rate.

Heretofore, it was thought that the determinative or critical factors influencing the closing characteristic of an excess-flow check valve and the ability to repetitively perform in accordance with such characteristic was the strength and life-time of the excess-flow spring. However, we have discovered that the travel of the poppet member 26 is critical to achieving accurate closing flow rates and repeatability, and further can be varied to achieve variations in the closing flow rates for different applications.

In FIG. 2 the retainer member 28 is shown positioned flush with the nose portion end of the valve body part 22, while in FIG. 3 it is recessed a predetermined distance to reduce the travel of the poppet member 26 and establish a closing flow rate differing from that achieved by the position shown in FIG. 2. The travel of the poppet 26 is critical because the distance between the poppet member 26 and orifice 48 determines the flow area for the fluid passed through the valve 20. We have found that by definitely fixing the travel of the poppet member 26 by means of the poppet-retainer member 28 and therefore the critical flow area, the differential pressure established by the fluid flow therethrough and required to initiate the movement of the poppet member 26 toward the orifice 48 can be accurately established. As the poppet moves closer to the orifice 48 (thus reducing the travel), the initial predetermined flow area is reduced. Consequently, the velocity of the fluid flow through the orifice 48 is increased because the pressure differential across the valve is maintained. This increased velocity establishes a low pressure area downstream of the nose of the poppet member 26, such that it continues its closing movement resulting from the greater differential pressure thus established.

EXCESS-FLOW VALVE OF FIGS. 4–6

Referring now to FIGS. 4, 5, 6 and 7 another embodiment of the excess-flow valve of the present invention is shown. The excess-flow valve 20' of FIGS. 4–7 includes a body part 22' including a flow passage 36' communicating with ports 38' and 40'. The check valve member 26' of the valve 20' is provided with guide webs or legs 51' spaced apart to allow fluid to flow through the passageway 36', yet serving to guide the check valve member 36' by means of an annular guide surface 55 of the valve body part 22'. The check valve member 26' also includes four equally-spaced guide webs 54 adapted to engage the wall of the large chamber 44' and guide same in its movement toward and away from the orifice 48' formed between the large chamber 44' and the small chamber 46' of the valve 20'. Intermediate the guides 51' and the guides 54, the valve member 26' is provided with an annular, protruding valve seat engaging portion 56, bevelled to correspond to and sealingly engage the annular valve seat 58 provided on the valve body 22' adjacent to the guide surface flange 55. A retainer ring 60 is fitted within a groove provided in the chamber 44 to limit the distance which the check valve member 26' may be moved away from the orifice 48'. Rotatably mounted to the valve body 22', there is provided a cam member 62 and its associated shaft 64, the shaft 64 being threaded at its inner end and provided with a nut 66 and washer 68 to secure the cam member 62 to the end of the shaft and disposed to engage the valve member 26' along the central axis of the valve 20'. The shaft 64 is also provided with a lubricating bearing 72 and appropriate seal ring 74 where it passes through the valve body 22'. Located externally of the valve 20' and secured to the shaft 64, there is provided a handle 76. The handle 76 includes a pointer portion 78 positioned relative to a scale 80 having indicia thereon to indicate the position of the cam member 62 and the corresponding closing flow rate established thereby.

Figure 5:
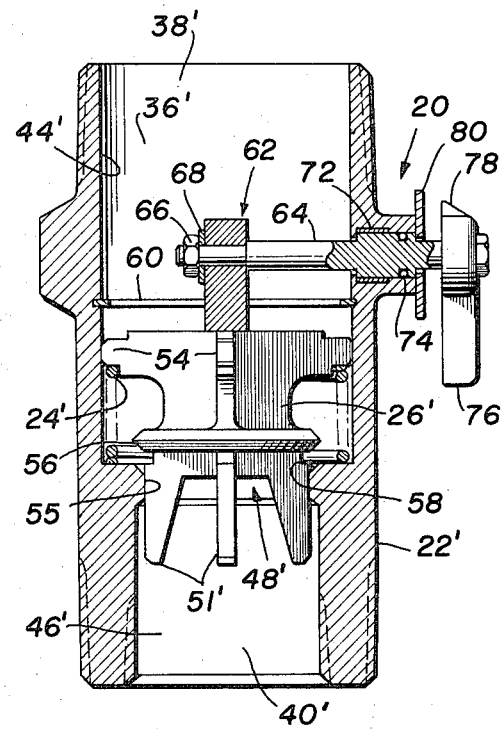
FIG. 5 is a cross-sectional view similar to that of FIG. 4 with the retainer member shown rotated to fix the valve member at a predetermined closing rate position.
Figure 6:
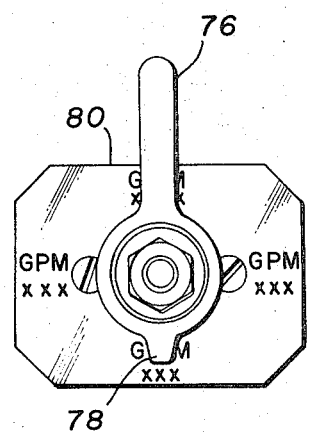
FIG. 6 is a detailed view of the indicia and handle mechanism of the excess-flow valve of FIG. 4.
Figure 7:
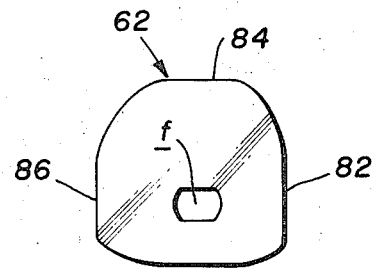
FIG. 7 is a detailed view of the cam used with the excess-flow valve of FIG. 4.

The closing flow rate of the excess flow valve 20' is adjusted by rotating the handle 76 to position the cam member 62 such that one of its lobes or flats 82, 84, 86 engages the check valve member 26' and compresses the excess-flow spring 24', see FIG. 5. Such rotation causes the check valve 26' to move to predetermined positions, thereby establishing the travel corresponding to desired closing flow rate. As may be seen in FIG. 7, the distance of the flats 82, 84 and 86 from the axis of rotation f of the cam establishes different travel spacings for the valve 20'. It may be observed in FIG. 6 that the predetermined closing flow rate is indicated to the operator.

Many modifications and variations of the present invention are possible in light of the above teachings. It is therefore to be understood that the invention may be practiced otherwise than as specifically described.

We claim:

1. An excess-flow check valve assembly of the type which may be readily adjusted to effect closing at different predetermined rates of flow, comprising
    a body member including an orifice and a fluid-flow passage communicating with first and second ports thereof,
    a substantially impermeable valve member of a size sufficient to close said orifice and prevent leakage of fluid therethrough when registered therewith, said valve member being slidably retained within said fluid flow passage for movement toward and away from said orifice,
    means within said body member adapted to engage and position said valve member at an adjustable predetermined selected distance from said orifice, and
    means within said body member for resiliently maintaining engagement of said valve member with said engaging and positioning means, thereby to fix the spacing between said orifice and said valve member when the fluid flow rate is less than the desired closing flow rate,
    whereby predetermined closing flow rates for such check valve may be readily set by positioning said valve member engaging means such that the said valve member is spaced from said orifice a precisely predetermined and repeatable distance corresponding to the desired closing flow rate with said valve assembly oriented in any physical position.

2. The excess-flow check valve assembly as defined in claim 1, wherein
    said valve member adjusting means is an annular retainer plug adjustably secured to said body member within said fluid flow passage and with one of its flat surfaces in abutting engagement with said valve member.

3. The excess-flow check valve assembly as defined in claim 1, wherein
said valve member adjusting means is a cam member positioned within said body member for movement within said fluid flow passage, said cam member including a cam surface adapted to engage said valve member thereby to adjustably determine the position thereof at predetermined distances from said orifice.

4. The excess-flow check valve assembly as defined in claim 3, further comprising
means positioned externally to said body member and mechanically coupled to said cam member for actuating same to selected positions and indicating the excess flow closing rate corresponding to respective selected positions.

5. The excess-flow check valve assembly as defined in claim 3, wherein said cam surface of said cam member includes flattened regions spaced at different distances from the cam axis to space said valve member at predetermined distances from said orifice.

6. A variable excess-flow check valve, comprising
a generally cylindrical body member including first and second ports connected in fluid flow communication by a passage including first and second chambers, said first chamber having a larger diameter than said second chamber thereby defining a check valve orifice therebetween,
a substantially impermeable poppet member slidably disposed within said first chamber for movement toward and away from said orifice to open and close said orifice in accordance with the pressure drop established thereacross as a result of fluid flow from said first port to said second port,
annular poppet retainer means adjustably secured within said first chamber to abut said poppet member and position same at predetermined and repeatable distances from said orifice, and
spring means fitted within said second chamber and having one end engaging said poppet member for resiliently positioning same in engagement with said poppet retainer means, thereby to fix the spacing between said orifice and said poppet member when the fluid flow rate is less than the desired closing flow rate with the check valve assembly in the desired orientation,
whereby the position of said poppet retainer member within said first chamber may be readily adjusted to determine the excess-flow closing rate of said check valve.

* * * * *